US009246994B2

(12) United States Patent
Julien et al.

(10) Patent No.: US 9,246,994 B2
(45) Date of Patent: Jan. 26, 2016

(54) METHOD AND SYSTEM FOR DISTRIBUTING A NETWORK APPLICATION AMONG A PLURALITY OF NETWORK SITES ON A SHARED NETWORK (75) Inventors: Martin Julien, Laval (CA); Robert Brunner, Montreal (CA); Laurent Marchand, Montreal (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 505 days.

(21) Appl. No.: 13/167,398

(22) Filed: Jun. 23, 2011

(65) Prior Publication Data
US 2013/0039657 A1 Feb. 14, 2013

(51) Int. Cl.
*H04L 12/50* (2006.01)
*H04L 29/08* (2006.01)
*H04L 29/14* (2006.01)
*H04L 12/933* (2013.01)

(52) U.S. Cl.
CPC ............ *H04L 67/1002* (2013.01); *H04L 67/10* (2013.01); *H04L 69/40* (2013.01); *H04L 49/1515* (2013.01); *H04L 49/1569* (2013.01)

(58) Field of Classification Search
None
See application file for complete search history.

(56) References Cited

U.S. PATENT DOCUMENTS

| 6,965,592 | B2 | 11/2005 | Tinsley et al. | |
|---|---|---|---|---|
| 7,643,468 | B1 | 1/2010 | Arregoces et al. | |
| 7,720,061 | B1 | 5/2010 | Krishnaswamy et al. | |
| 7,843,908 | B2 * | 11/2010 | Rojas-Cessa et al. | 370/386 |
| 8,484,656 | B2 * | 7/2013 | Raja et al. | 718/105 |
| 2002/0152305 | A1 | 10/2002 | Jackson et al. | |
| 2003/0152072 | A1 * | 8/2003 | Guild et al. | 370/386 |
| 2006/0013207 | A1 * | 1/2006 | McMillen et al. | 370/388 |
| 2007/0121499 | A1 * | 5/2007 | Pal et al. | 370/230 |
| 2008/0175587 | A1 * | 7/2008 | Jensen | 398/2 |
| 2008/0267182 | A1 * | 10/2008 | Smiljanic | 370/390 |
| 2010/0083345 | A1 * | 4/2010 | Panwar et al. | 726/1 |
| 2010/0131960 | A1 * | 5/2010 | Suganthi et al. | 718/105 |
| 2010/0158031 | A1 * | 6/2010 | Thomas et al. | 370/412 |
| 2010/0165843 | A1 * | 7/2010 | Thomas | 370/235 |
| 2010/0232784 | A1 * | 9/2010 | Rarick et al. | 398/5 |
| 2011/0004700 | A1 * | 1/2011 | Sprague et al. | 709/236 |
| 2011/0085557 | A1 * | 4/2011 | Gnanasekaran et al. | 370/401 |
| 2011/0307718 | A1 * | 12/2011 | Aybay et al. | 713/310 |
| 2012/0102506 | A1 * | 4/2012 | Hopmann et al. | 719/328 |
| 2012/0155453 | A1 * | 6/2012 | Vohra et al. | 370/352 |
| 2012/0304191 | A1 * | 11/2012 | Morgan | 718/105 |

FOREIGN PATENT DOCUMENTS

| EP | 1455483 A2 | 9/2004 |
|---|---|---|
| WO | 2004066278 A2 | 8/2004 |

* cited by examiner

*Primary Examiner* — Bob Phunkulh
(74) *Attorney, Agent, or Firm* — Murphy, Bilak & Homiller, PLLC (57) ABSTRACT

Presented is a system and method for distributing a network application across a plurality of geographically dispersed network sites. The system comprises a plurality of network sites connected by a shared network and interconnected by a dedicated non-blocking communication network. The system can use different interconnecting network topologies based on the number of sites to be interconnected. The method balances the network application load and resources across the interconnected network sites based on a distribution policy implemented without burdening the shared network. The method provides redundancy capabilities by detecting the loss of a network site and redistributing the network application load to the remaining network sites.

9 Claims, 12 Drawing Sheets

METHOD AND SYSTEM FOR DISTRIBUTING A NETWORK APPLICATION AMONG A PLURALITY OF NETWORK SITES ON A SHARED NETWORK

TECHNICAL FIELD

The present invention relates generally to distributing an application across a multi-site system and more specifically to connecting a multi-site system such that an application appears to run as a single instance split physically across multiple sites.

BACKGROUND

In general, communication networks are constructed from interconnected network systems, with each system providing support for networking applications. Typically, different network systems provide support for different types of network activity and accordingly lend themselves to running network applications associated with the network system's role in the network hierarchy. For example, in the context of the internet, network applications such as routers, switches and gateways typically perform their responsibilities in a network hierarchy based on their functional requirements and their capacity. In this regard, any particular network application may be located in a particular network level depending on the provided network functions or the relative cost and complexity of the system.

Figure 1:
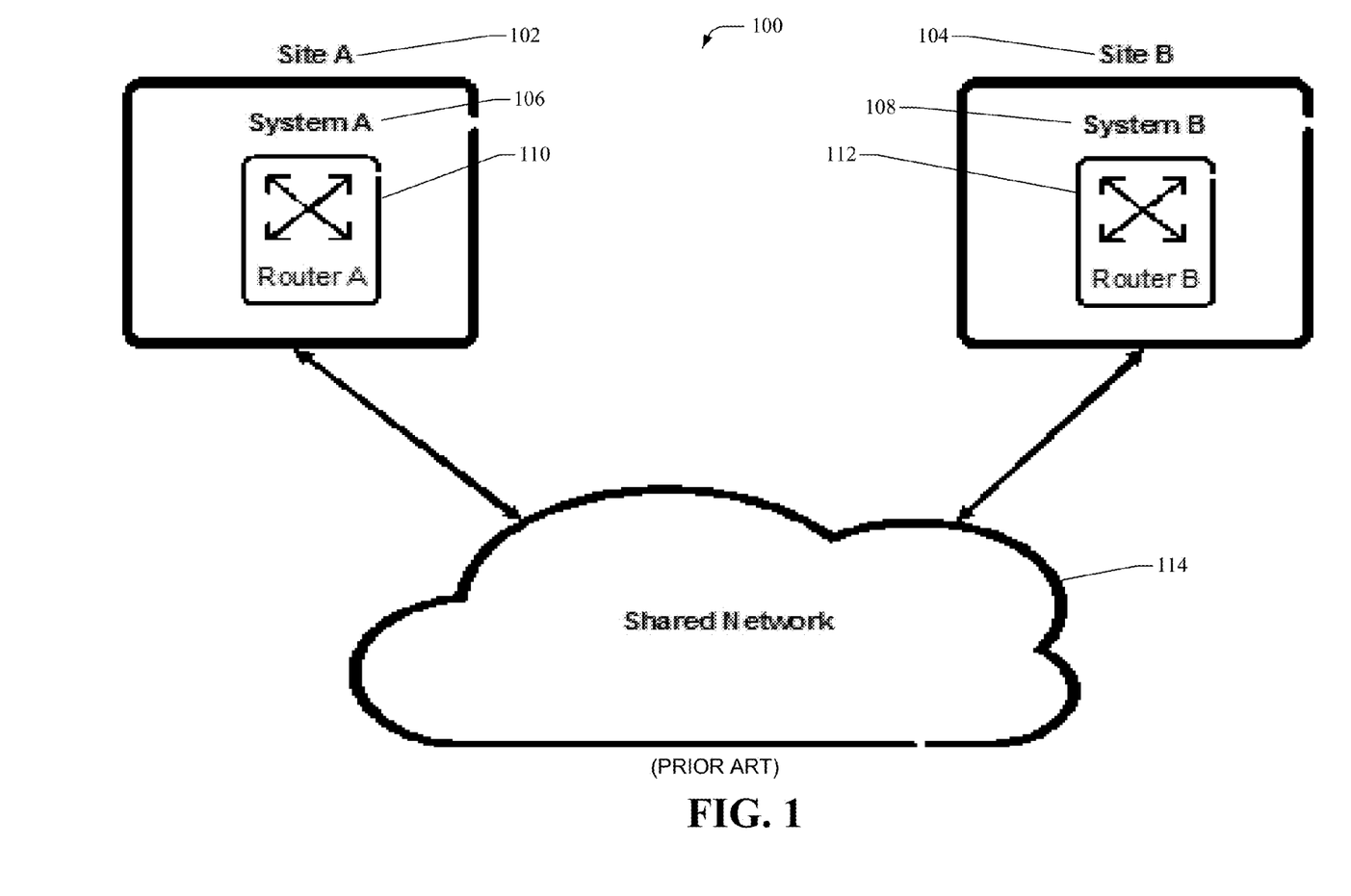
FIG. 1 depicts a prior art system providing a network application at two different geographical sites.

Current network applications typically are designed and developed for network systems that are provisioned, maintained and managed on a site-by-site basis. In this context, a site refers to a particular geographical location. Accordingly, each network site will administer their installed network systems and applications. For example, FIG. 1 illustrates two prior art network sites, Site A and Site B connected by a network and implement two network systems, System A and System B. Further in the prior art example, two network applications, Router A, installed in System A, and Router B, installed in System B, are illustrated. In this prior art example, Router A and System A are provisioned and administered independently from Router B and System B.

Figure 2:
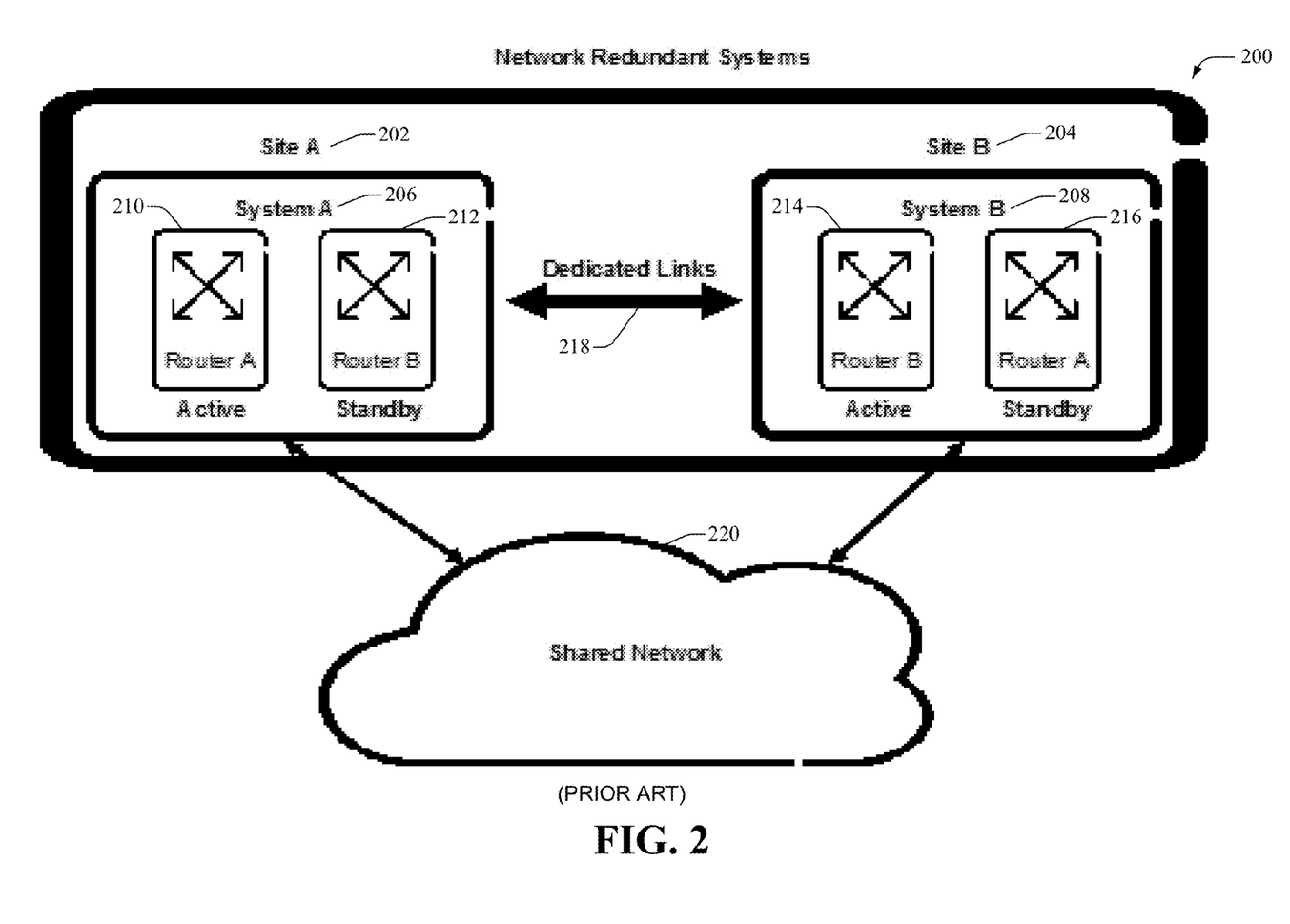
FIG. 2 depicts a prior art system providing a redundant network application at two different geographical sites.

In another aspect of current network systems, illustrated in FIG. 2, is the typical design for providing support for a system capable of withstanding a catastrophic failure of network components. Addressing this requirement in today's network systems requires some network providers, such as telecom systems, to include redundant systems in their designs. Typically, a redundant solution requires the installation of identical equipment on geographically different sites. In the event of a catastrophic failure of one of the sites, the other site can take over the responsibilities of both sites.

Problems associated with typical network designs revolve around the site-centric implementation described above. In an example where a network application, for example an Internet Protocol (IP) router, is required on two geographically different sites on a network, a network system providing an IP router application would prescribe installing the IP router application on each site. Consequently, provisioning, management and maintenance of the IP router application is also required on both sites leading to additional cost, effort and possibility for mistakes in configuration. Further, when a networking application is installed on geographically disparate sites, each system must be specified based on the intended network traffic capacity for the site. Consequently, the network inherits a responsibility for routing of packets to each of the systems while considering the load capabilities of each system and therefore requires some form of a traffic engineer component for performing load balancing to maintain acceptable operation between the two systems.

Another problem associated with current network designs relates to networks, such as telecom networks, required to comply with stringent requirements associated with redundancy and resiliency. Accomplishing an advanced, high availability solution with existing systems and technology typically involves providing two fully redundant systems in geographically different sites with each system sized for twice the required capacity. In the case of a catastrophic failure of one of the sites, the other site is prepared to take over the traffic of the failed site. This solution is very expensive because each site must be sized for the full capacity of the system but typically never uses more than half of its capacity. Many network applications are not cost effective with this type of design.

Accordingly, market pressure is building for a method and system capable of providing single point management of network applications distributed among disparate geographical sites and capable of providing failover support when any given geographical site experiences a catastrophic failure.

SUMMARY

A system and method address the market needs described above by providing the capability to distribute a network application across a geographically dispersed multi-site system. The system and method allow a single point control and management of the network application. The system and method further provide a load-balancing capability to maintain optimum network application performance for all clients. The system and method also provide a measure of redundancy by providing the ability to reallocate network application workload based on the failure of any particular network site.

In an exemplary method embodiment, the plurality of network sites, already connected by a shared network, are further interconnected by a dedicated non-blocking communication network. In another aspect of the exemplary method embodiment, the network application distributed throughout the multi-site entangled system is provisioned, managed and maintained from a single location. In the exemplary method embodiment, a traffic distribution component analyzes the multi-site entangled system and distributes the network application workload across the sites based on a distribution policy associated with the network application.

In another exemplary embodiment, a system is provided for interconnecting a plurality of geographically dispersed sites, connected by a shared network. In one aspect of the exemplary embodiment, a dedicated non-blocking communication network provides the ability to distribute a network application across the plurality of geographically dispersed network sites. Continuing with the exemplary embodiment, a control component provides the ability to analyze the resource utilization of the network sites with respect to the network application and distribute the network application workload based on said analysis.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Looking first to FIG. 1, a diagram 100 of a prior art method of providing a network application 110, 112 on two different geographical sites 102, 104 is illustrated and will provide a context for describing the exemplary embodiments provided herein. The prior art method includes site A 102 and site B 104 as two geographically distinct sites with system A 106 operating on site A 102 and system B 108 operating on site B 104. Further, the prior art method depicts a network application, router A 110, provisioned and operating on system A 106 and another copy of an identical network application, router B 112, operating on system B 108. As illustrated in this prior art embodiment, site A 102 and site B 104 are communicatively connected by the shared network 114.

Continuing with the prior art embodiment depicted in FIG. 1, the network router application running on site A 102 and the network router application running on site B 104 are identical but they must be provisioned, managed and maintained independently at the two different geographical sites, site A 102 and site B 104. In another aspect of this prior art embodiment, all communications between the systems and network applications on site A 102 and site B 104 must be sent through the shared network 114. Further, there is not any capability to distribute access among router A 110 and router B 112.

Looking now to FIG. 2 and a prior art embodiment of a network system for providing a redundant network application 200, including site A 202 and site B 204 positioned in different geographical locations, system A 206 located on site A 202 and system B 208 located on site B 204, active router A 210 and standby router B 212 operational on system A 206, active router B 214 and standby router A 216 operational on system B 208, with system A 206 and system B 208 communicatively connected by a dedicated link 218 and a shared network 220. It should be noted that standby router B 212 and standby router A 216 do not exist as physically separate entities, they are unused capacity of router B 214 and router A 210, respectively, overdesigned to provide the ability to support the others capacity should a catastrophic failure of one or the other occur. It should further be noted in the prior art exemplary embodiment that the dedicated link 218 is operational only to indicate a failure to one system of the other system and accordingly when to provide the redundant support. For example, in the context of the prior art geographical network redundancy, the one or more links interconnecting the redundant systems are typically used for user and system state information synchronization between the redundant systems. In another example of a prior art exemplary embodiment, in prior art Network Redundant Systems, a dedicated link 218 is needed. In the event that either System A 206 or System B 208 loses connectivity to the shared network 220, all failover mechanisms would not work without a dedicated link 218 i.e. System A 206 would assume that System B 208 is down and start acting on its behalf while System B 208 would assume that System A 206 is down and would do the same. Such a situation is typically avoided via the use of a dedicated link 218 which runs independently of the connectivity between System A 206 and System B 208 via a shared network 220.

Looking now to the exemplary embodiments associated with this disclosure, described are multi-site entangled systems operating as a single system distributed geographically across different sites. The exemplary embodiment network applications physically exist on the different geographical sites but the provisioning, management and maintenance of the network applications is performed at a centralized location for each network application. In this context, the partitioning of a network application across multiple sites could be based, for example, on processing capacity considerations or client utilization location. As an example, a client request received at one entangled system site could be forwarded to and processed by another entangled system site based on the distribution policy defined for the network application.

In another aspect of the exemplary embodiments, when a network application is evenly distributed across the entangled system sites, a catastrophic failure by one of the entangled sites can be used to limit the impact of the failure. In the exemplary embodiment, assuming the capacity of the network application at each of the entangled system sites is identical, a catastrophic failure of one of the entangled system sites would result in the loss of only the capacity of that site with respect to the overall capacity of the entangled system. Continuing the exemplary embodiment with the multi-site entangled system configuration, the entangled sites must be interconnected with a dedicated link as previously described. For example, if the entangled system is to function as a single distributed larger system then the dedicated link must be efficient and have characteristics such as minimal latency between the entangled nodes, minimal jitter between the entangled nodes and minimal energy consumption i.e. the entangled system nodes should behave as if they are located at the same geographical site. An implication of this requirement is that the interconnection should allow non-blocking communications between the entangled nodes. It should be noted in the exemplary embodiments that the dedicated link is a requirement based on a quality of service of the communication links and therefore the dedicated link can be either a physically separate dedicated link or a logically separate dedicated link on a shared communication link meeting the same requirements provided by a physically separate dedicated link.

Figure 3:
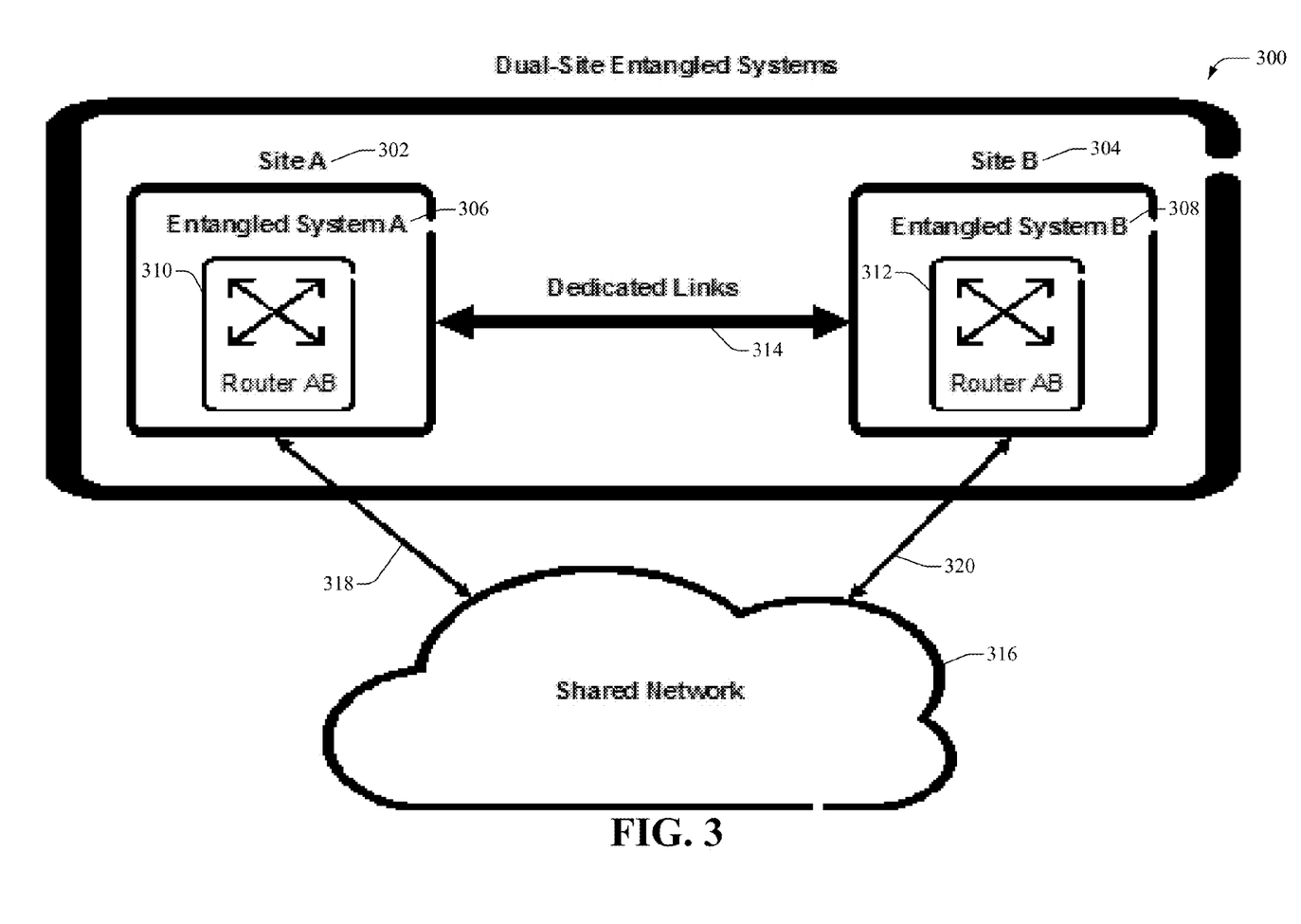
FIG. 3 depicts a dual-site entangled system for distributing network applications, with a single administrative location, among a pair of geographical sites.

Looking now to FIG. 3, an exemplary embodiment 300 of a dual-site entangled system is depicted, including a site A 302 containing entangled system A 306 wherein network application router AB 310 is operational, a site B 304 containing entangled system B 308 wherein network application router AB 312 is operational, a dedicated link 314 communicatively connecting site A 302 and site B 304, and a shared network 316 communicatively connected to entangled system A 306 by network link 318 and to entangled system B 308 by network link 320. It should be noted in the exemplary embodiment that the network application, router AB 310, 312 represents the same application running on the two geographically different systems but will behave as a single network application distributed between the two sites. For example, the two network applications 310, 312 are provisioned, managed and maintained from a single location and use the dedicated link 314 as the control lines between the entangled systems. It should also be noted in the exemplary embodiment that dedicated link 314 is a different communication network than network links 318, 320.

Figure 4:
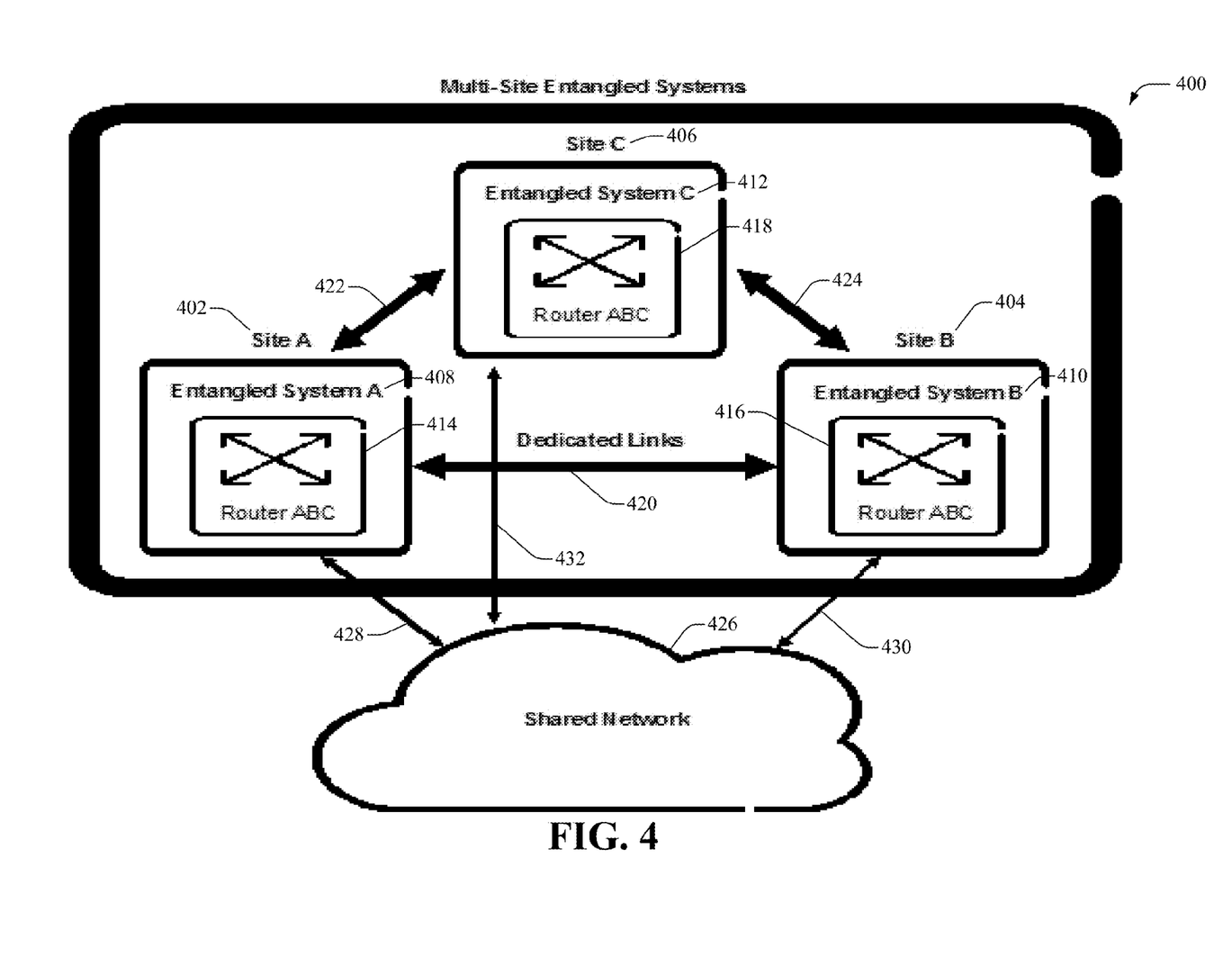
FIG. 4 depicts a multi-site entangled system for distributing network applications, with a single administrative location, among a plurality of geographical sites.

Turning now to FIG. 4, an exemplary embodiment of a multi-site entangled system 400 connected to a shared network 426 is depicted, including site A 402 containing entangled system A 408 wherein network application router ABC 414 is operational, site B 404 containing entangled system B 410 wherein network application router ABC 416 is operational, site C 406 containing entangled system C 412 wherein network application router ABC 418 is operational, dedicated link 420 communicatively connecting site A 402 to site B 404, dedicated link 422 communicatively connecting site A 402 to site C 406, dedicated link 424 communicatively connecting site B 404 to site C 406 and shared network 426 communicatively connected to entangled system A 408 by network link 428, to entangled system B 410 by network link 430 and to entangled system C 412 by network link 432. It should be noted in the exemplary embodiment that while entangled system A 408, entangled system B 410 and entangled system C 412 are each nodes on shared network 426 by way of network links 428, 430 and 432 respectively, dedicated links 420, 422, 424 are separate communication links from each other and from shared network 426.

Further, the exemplary embodiment illustrates that the network application router ABC 414, 416, 418 is operational on each entangled system, as depicted in the dual entangled exemplary embodiment of FIG. 3, but extended to each entangled system included in the multi-site entangled system. It should be noted in the exemplary embodiment that a large number of entangled systems and their associated network applications can be added to the multi-site entangled system, limited only by the requirements of the dedicated links for communication between the entangled systems. In a further aspect of the exemplary embodiment, a multi-site entangled system allows for the distribution of a network application across multiple sites. The network application partitioning of the exemplary embodiment between multiple sites therefore could be based on data processing capacity or data distribution considerations. Accordingly in the exemplary embodiment, a request received at one of the entangled systems can be processed on the entangled system originally receiving the request or forwarded to another entangled system for processing based on the distribution policy associated with the particular network application. It should be noted in the exemplary embodiment that different network applications can have different distribution policies allowing for multi-faceted balancing of network resources and services.

Figure 5:
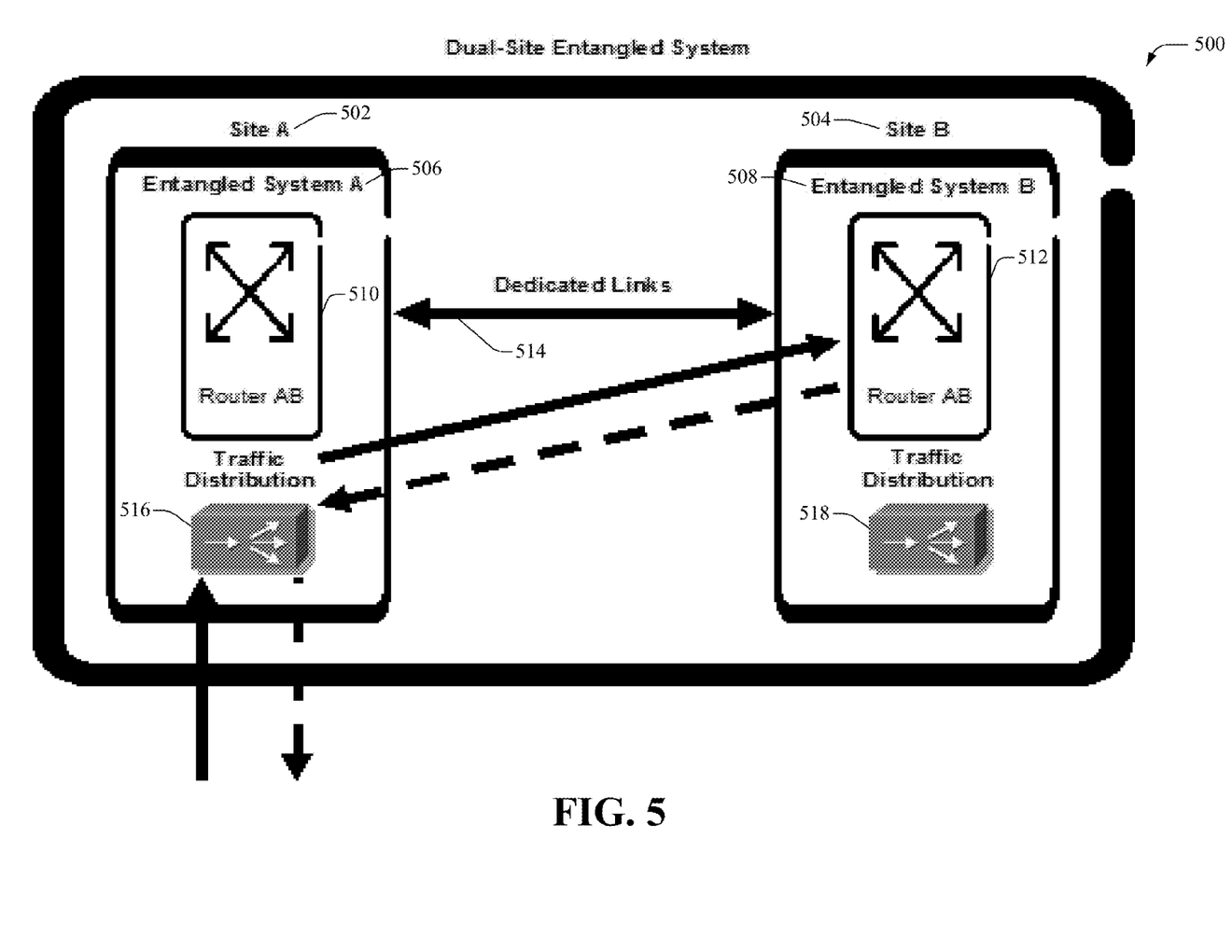
FIG. 5 depicts a dual-site entangled system for distributing network applications, with a single administrative location, among a pair of geographical sites and including traffic distribution components for optimizing utilization and load balancing.

Looking now to FIG. 5, an exemplary embodiment 500 of a dual-site entangled system is depicted, including a site A 502 containing entangled system A 506 wherein network application router AB 510 is operational, a site B 504 containing entangled system B 508 wherein network application router AB 512 is operational, a dedicated link 514 communicatively connecting site A 502 and site B 504, a traffic distribution component 516 associated with entangled system A 506 and a traffic distribution component 518 associated with entangled system B 508. It should be noted in the exemplary embodiment that a distribution mechanism in each entangled system provides for properly redirecting communication traffic between all the entangled systems in an efficient and adaptable manner.

Continuing with the exemplary embodiment, as each packet is received at an entangled system a decision is made concerning a processing destination for the packet. Based on the exemplary embodiment's distribution policy, associated with the packet's application destination, an entangled system destination is determined for the packet. In the exemplary embodiment, the packet can be forwarded to another entangled system for processing or it can be processed on the entangled system originally receiving the packet. Further, as illustrated in the exemplary embodiment, any reply associated with the request packet is returned along the request path to the entangled system originally receiving the request packet and the reply is ultimately returned to the client initiating the request.

Figure 6:
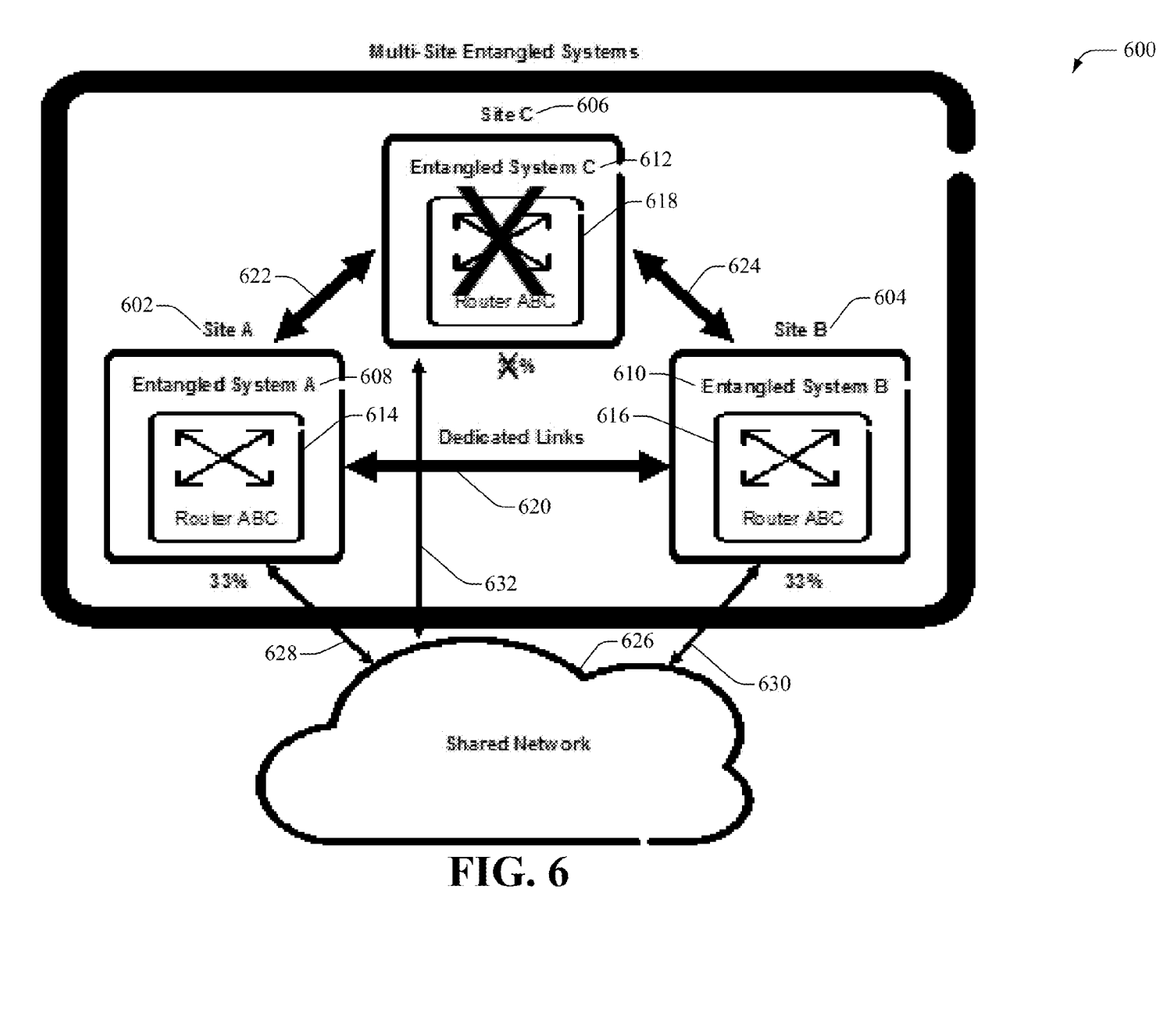
FIG. 6 depicts a multi-site entangled system for distributing network applications, with a single administrative location, among a plurality of geographical sites and a catastrophic failure of one of the entangled systems.

Turning now to FIG. 6, an exemplary embodiment of a multi-site entangled system 600 connected to a shared network 626 is depicted, including site A 602 containing entangled system A 608 wherein network application router ABC 614 is operational, site B 604 containing entangled system B 610 wherein network application router ABC 616 is operational, site C 606 containing entangled system C 612 wherein network application router ABC 618 is operational, dedicated link 620 communicatively connecting site A 602 to site B 604, dedicated link 622 communicatively connecting site A 602 to site C 606, dedicated link 624 communicatively connecting site B 604 to site C 606 and shared network 626 communicatively connected to entangled system A 608 by network link 628, to entangled system B 610 by network link 630 and to entangled system C 612 by network link 632.

Continuing with the exemplary embodiment, network application routers ABC 614, 616, 618 are initially evenly distributed between entangled systems A 608, B 610 and C 612 with each network application router ABC 614, 616, 618 handling one-third of the demand for the service. Further in the exemplary embodiment, entangled system C 612 has a catastrophic failure and router ABC 618 is lost to the multi-site entangled system 600. Next in the exemplary embodiment, the remaining entangled systems, entangled system A 608 and entangled system B 610 become aware of the failure of entangled system C 612 and network application router ABC 614, 616 can provide the additional capacity required based on the loss of network application router ABC 618. It should be noted that, in the exemplary embodiment, the failure of one site of an entangled system will result in only the loss of the failed system capacity, assuming each entangled system represents the same capacity. As illustrated in the multi-site entangled system 600, only one-third of the multi-site entangled system 600 capacity is lost with the failure of entangled system C 612. For example, a failure of one of the systems of an entangled system 600 results in a graceful degradation of service for the entire entangled system 600. In the exemplary embodiment, a graceful degradation implies that the entangled system 600 may lose a portion of the traffic capacity based on the current loading of the entire entangled system 600. For example, if the current capacity of the entangled system was at sixty percent of capacity and one of three equivalent systems failed, then the overall entangled system is still at sixty-six percent of capacity and therefore the current traffic would remain unaffected by the loss of one system. In contrast to the concept of network redundancy illustrated in prior art FIG. 2, the remaining entangled systems simply have to provide their fair contribution to the overall system capacity. A network configuration requirement of a hot standby is accomplished by distributing active and standby capacity across the entangled sites of the multi-site entangled system 600. It should be noted in the exemplary embodiment that based on the level of redundancy required, permanent and transient data, as well as some processing functions, may require synchronization between the systems of an entangled system 600.

Figure 7:
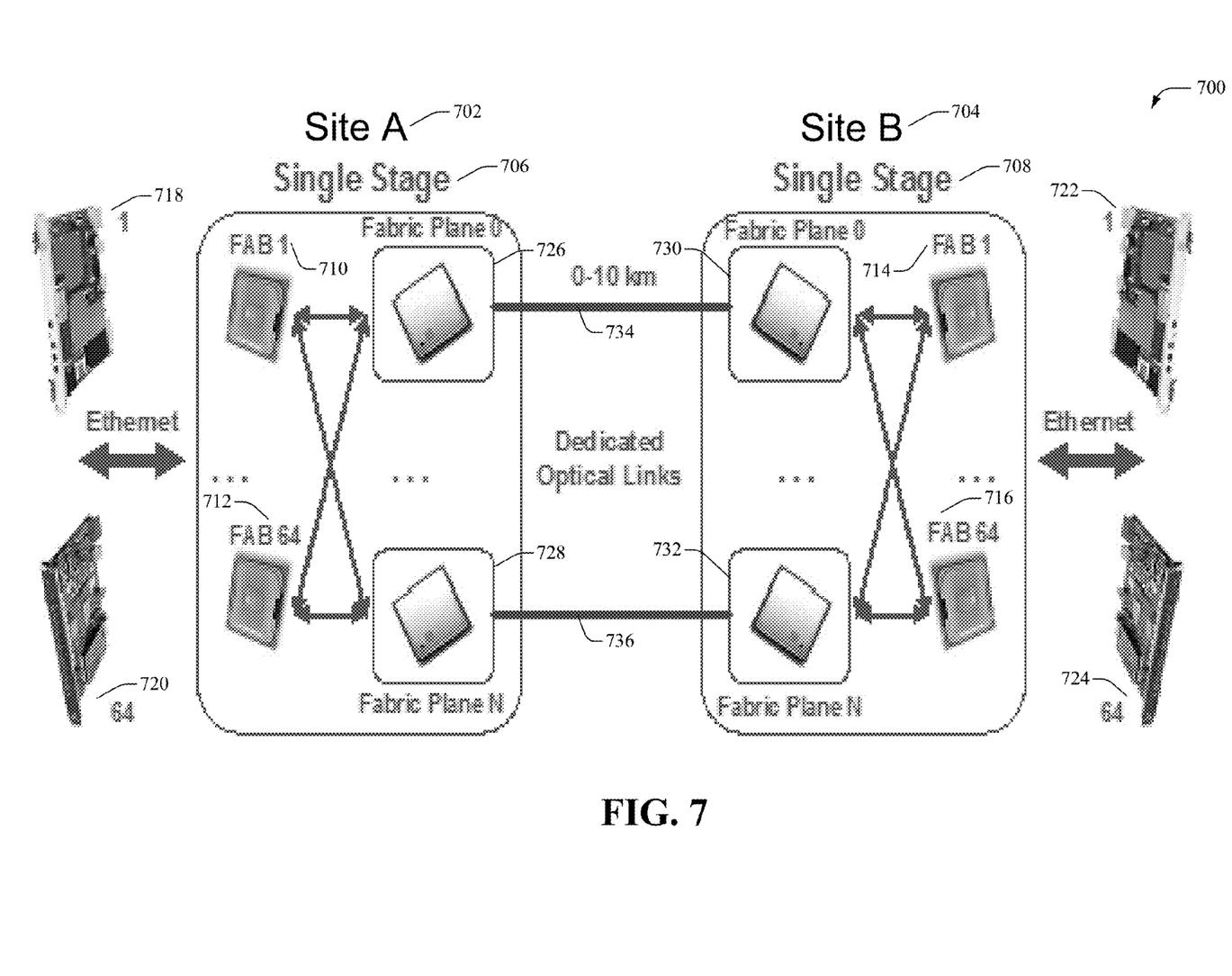
FIG. 7 depicts a dual-site entangled system for distributing network applications, with a single administrative location, among a pair of geographical sites, including a single-stage non-blocking fabric architecture for interconnecting the entangled systems.

Turning now to FIG. 7, an exemplary embodiment of a dual-site entangled system 700 is depicted, including site A 702 containing a single-stage fabric switch 706, site B 704 containing a single-stage fabric switch 708 and the dedicated optical links 734 and 736 connecting site A 702 to site B 704. Further in the exemplary embodiment of site A 702, the fabric adapter bridges (FAB) 710, 712 acts as a fabric adaption layer between the entangled system's processing components 718, 720 and the core fabric element bridges (FEB) 726, 728 hardware. It should be noted in the exemplary embodiment that the FAB components 710, 712 are optional, meaning the processing components 718, 720 can be directly connected to the FEBs 726, 728 if adaptation is not required. Similarly, in the exemplary embodiment of site B 704, the FEB 714, 716 acts as a fabric adaptation layer between the entangled system's processing components 722, 724 and the core FEB 730, 732 hardware.

It should be noted in the exemplary embodiment that the FEBs are responsible for switching information between the entangled system's processing components. Further, it should be noted in the exemplary embodiment that depending on the technology selected for interconnecting the entangled systems with dedicated links, the characteristics of the switch fabric can differ in terms of bandwidth, latency, energy, efficiency, reachability, congestion management, quality of service (QoS), etc.

Continuing with the exemplary embodiment, in a multi-site entangled system, in order for the individual systems to act as a single distributed system, the sites should be interconnected extremely efficiently. The technology employed to connect the sites of the exemplary embodiment should focus on minimizing the communication latency between the nodes, minimizing the jitter between the links and the energy consumption of the entangled system so the individual systems can behave as if they are located on a single site. An implication of these characteristics is that the interconnection should allow non-blocking communications between the sites.

Typically in the exemplary embodiments, it is envisioned that the links interconnecting the sites are dedicated links, providing the capability to avoid the extra header information normally required for routing or switching packets on a private or a public network and reducing the bandwidth required to exchange the packets across multiple sites. In the exemplary embodiment, each FEB is connected to the FABs on the local site and the FEBs on the remote site. For example, FEB 726 on site A 702 is connected to local FABs 710, 712 and to FEBs 730, 732 on site B 704. Based on the interconnection strategy of the dual-site exemplary embodiment, each FEB can connect to a maximum of 64 FABs on their local site because of the necessity of connecting to the N FEBs on the associated remote site.

Further in the exemplary embodiments, although the preferred embodiments use dedicated links to interconnect the entangled systems, it would be possible to interconnect the systems without dedicated links if the characteristics for latency, jitter and non-blocking communications are fulfilled, providing for a guaranteed Quality of Service for these links. Exemplary embodiment interconnection strategies based on optical technologies, such as Single-Mode Fiber (SMF)/Wavelength-Division Multiplexing (WDM) can be used for a multi-site entangled system allowing a large bandwidth between the sites with low latency and high energy efficiency over long distances.

Continuing with the exemplary embodiments, interconnecting multiple sites to create a multi-site entangled system, according to the characteristics specified herein, allows to envision specific switch fabric architectures and, depending on whether a single-stage or a three-stage folded-Clos switch architecture is used, different FABs and FEBs interconnections can be optimally applicable. In the case of the exemplary embodiment dual site entangled system 700, providing the characteristic non-blocking bandwidth capacity, each FEB should balance its bandwidth capacity between the processor blades and the FEB located on the remote site. Accomplishing this balance in the exemplary embodiment is characterized by a FEB of each plane on one site interconnected to a FEB of each plane on another site. It should be noted in the exemplary embodiment that the fabric architecture can be implemented as a single-stage fabric as illustrated in FIG. 7 or as a multi-stage fabric such as the three-stage Clos fabric illustrated in FIG. 8. Further, a multi-plane concept exists wherein multiple instances of a fabric architecture e.g. single-stage and three-stage Clos are parallelized high availability and high bandwidth solutions.

Figure 8:
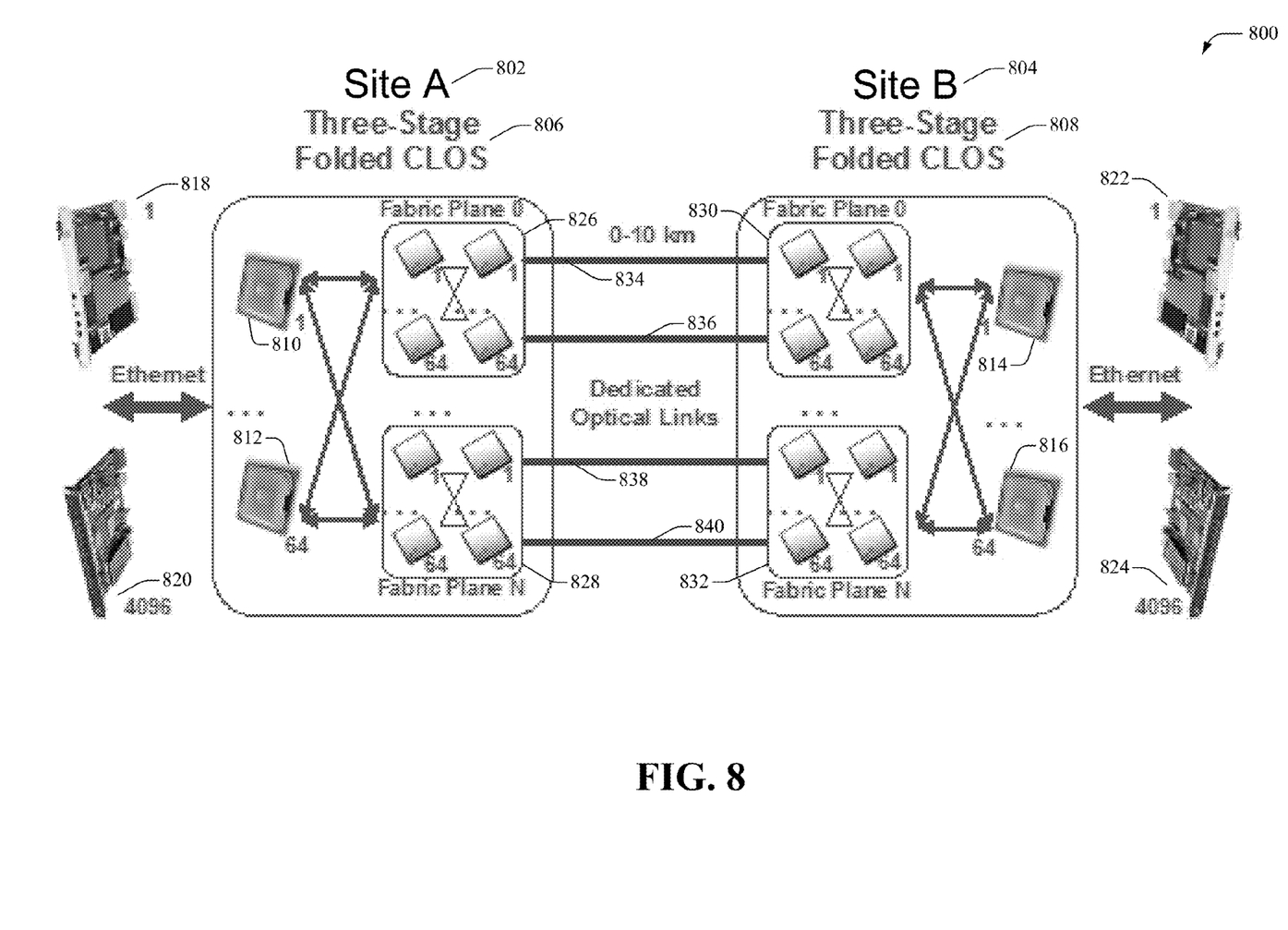
FIG. 8 depicts a dual-site entangled system for distributing network applications, with a single administrative location, among a pair of geographical sites, including a three-stage folded Clos non-blocking fabric architecture for interconnecting the entangled systems.

Looking now to FIG. 8, an exemplary embodiment 800 of a dual-site entangled system interconnected by a three-stage folded Clos architecture is depicted. Further, exemplary embodiment 800 includes site A 802 containing a multi-plane three-stage folded-Clos fabric architecture 806, site B 804 containing a multi-plane three-stage folded-Clos fabric architecture 808 and the dedicated optical links 834, 836, 838, 840 connecting site A 802 to site B 804. Further in the exemplary embodiment of site A 802, the fabric adapter bridge (FAB) 810, 812 acts as a fabric adaption layer between the entangled system's processing components 818, 820 and the core fabric element bridge (FEB) 826, 828 hardware. Similarly, in the exemplary embodiment of site B 804, the FAB 814, 816 acts a fabric adaption layer between the entangled system's processing components 822, 824 and the core FEBs (per plane) 830, 832 hardware. Next in the exemplary embodiment, the sites are interconnected by dedicated optical links 834, 836, 838, 840 between fabric planes.

Continuing with the exemplary embodiment, in an entangled system 800 configured as a dual-site, only the second stage of the switching is replicated on each entangled site. Further in the exemplary embodiment, non-blocking bandwidth capacity is provided by each second-stage FEB balancing its bandwidth capacity between the first/third stage FEBs, towards the processor blades and the second stage FEB located on the other entangled site. For example, the 8192 available processor blades are distributed between the two sites such that every second-stage FEB of each plane on one entangled site is interconnected to a second stage FEB of a plane on the other entangled site.

Figure 9:
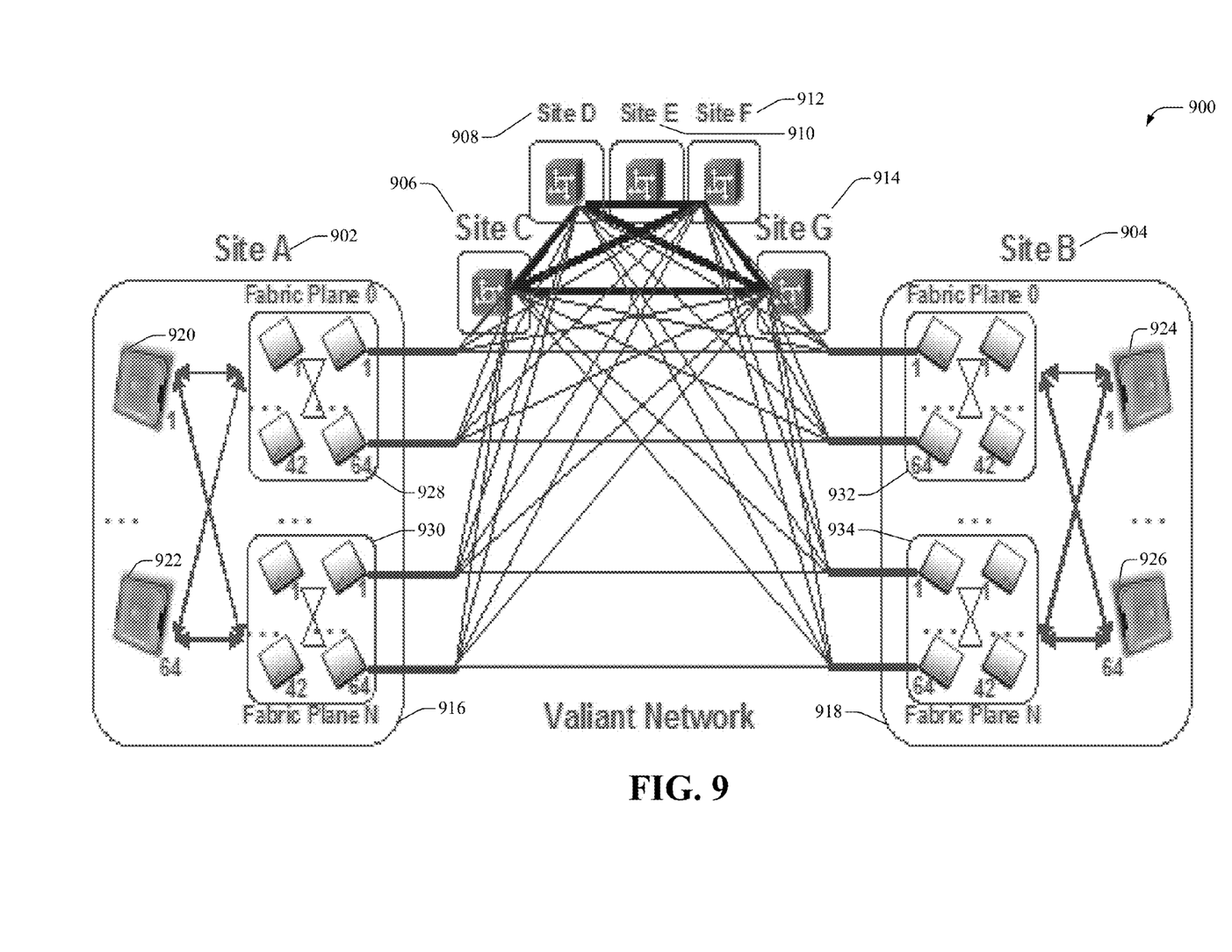
FIG. 9 depicts a multi-site entangled system for distributing network applications, with a single administrative location, among a multiplicity of geographical sites, including a three-stage folded Clos non-blocking fabric architecture for interconnecting the entangled systems.

Looking now to FIG. 9, an exemplary embodiment 900 of a multi-site entangled system with a "Valiant" load-balanced network topology interconnecting the entangled sites is depicted. Further, exemplary embodiment 900 includes entangled site A 902 containing a multi-plane three-stage folded-Clos fabric architecture 916, entangled site B 904 containing a multi-plane three-stage folded-Clos fabric architecture 918 and the Valiant topology network interconnecting entangled sites A 902, B 904, C 906, D 908, E 910, F 912 and G 914. Further in the exemplary embodiment of entangled site A 902, the fabric adapter bridge (FAB) 920, 922 acts as a fabric adaption layer between the entangled system's processing components and the core fabric element bridge (FEB) 928, 930 hardware.

Similarly, in the exemplary embodiment of entangled site B 904, the FAB 924, 926 acts a fabric adaption layer between the entangled systems processing components and the core FEB 932, 934 hardware. It should be noted in the exemplary embodiment that entangled sites C 906, D 908, E 910, F 912 and G 914 have similar designs as entangled sites A 902 and B 904. Continuing with the exemplary embodiment, the second-stage FEBs of each entangled site are connected to the FEBs of other entangled sites with each second-stage FEB distributing its dedicated links between all other entangled sites. Further in the exemplary embodiment, based on an even processing capability among the entangled sites, the dedicated links are evenly distributed among the entangled sites. The exemplary embodiment network topology allows not only for direct communication between any two entangled sites, entangled site A and entangled site B for example, on the dedicated network connecting the two entangled sites but also through other entangled sites, also directly connected by the dedicated network, that are asked to forward packets between the two entangled sites A and B.

Figure 10:
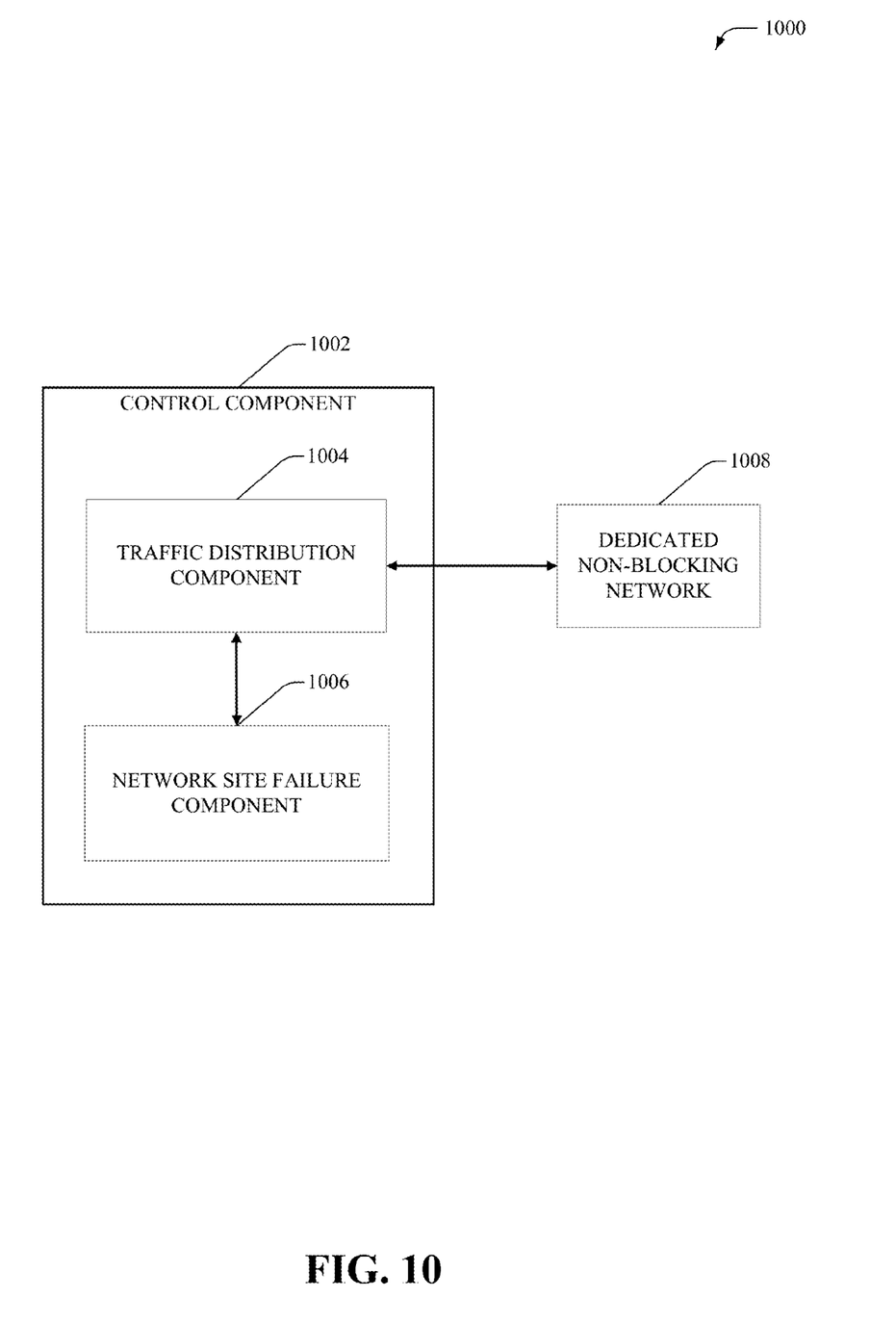
FIG. 10 depicts the control component of a multi-site entangled system for distributing network applications, with a single administrative location, including a traffic distribution component and a network site failure component.

Turning now to FIG. 10, an exemplary embodiment 1000 of a control component 1002 interacting with a dedicated non-blocking communication network is depicted. The exemplary embodiment 1000 includes a traffic distribution component 1004 and a network site failure component 1006. It should be noted that although the control component 1002 is illustrated as separate from the dedicated non-blocking communication network 1008, the control component 1002 can be part of the dedicated non-blocking communication network 1008.

Continuing with the exemplary embodiment 1000, the traffic distribution component 1004 provides the capability to distribute a network application's workload throughout the entangled system based on a distribution policy associated with the network application. In the exemplary embodiment 1000, the traffic distribution component can direct a particular packet's processing from the entangled site receiving the packet to another entangled site based on a entangled site resource analysis and return the results associated with the packet to the entangled site originally receiving the packet for return to the client.

Next in the exemplary embodiment 1000, the network site failure component 1006 provides the capability to determine that a particular entangled site is no longer responsive. Under the circumstances of an entangled site failure, the network site failure component 1006 notifies the traffic distribution component 1004 of the failure and the traffic distribution component 1004 can rebalance the particular network application workload based on a new entangled system resource analysis. It should be noted that a similar analysis is performed for each network application associated with a failed entangled site.

Figure 11:
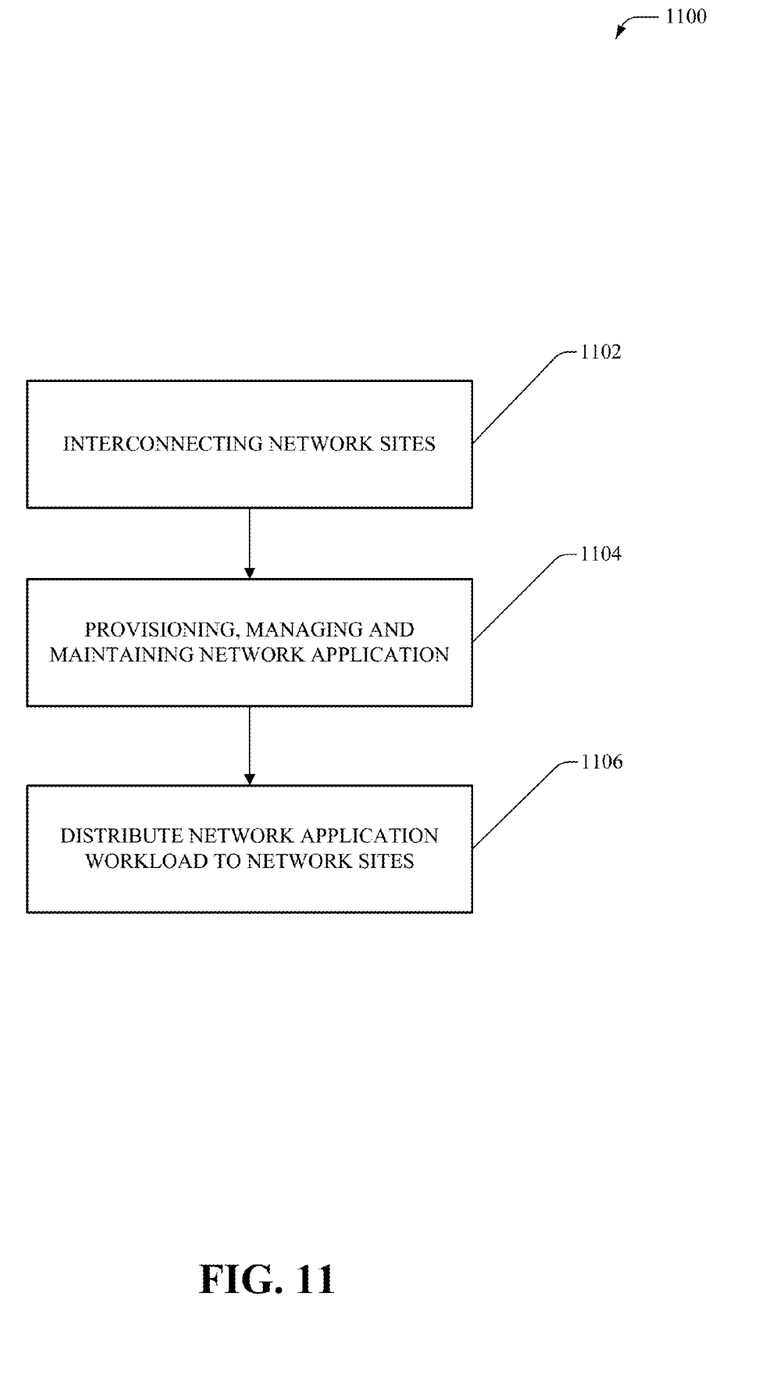
FIG. 11 depicts a method of implementing a multi-site entangled system, with a single administrative location, for distributing network applications.

Turning now to FIG. 11, an exemplary method embodiment 1100 based on a multi-site entangled system is depicted. Starting at exemplary method embodiment step 1102, the network sites, already connected by a shared network, are interconnected with a dedicated non-blocking communication network. The exemplary embodiment network topology of the dedicated non-blocking communication network can vary based on the number of sites interconnected and the geographical distance between the sites. Examples of the internal fabric network topologies include, but are not limited to single-stage fabric switch architecture and three-stage folded Clos architecture.

Continuing at step 1104 of the exemplary method embodiment, network applications are provisioned on as many sites as required based, for example, on entangled site resources and network application utilization. Further at exemplary embodiment step 1104, management of the network application is performed. For example, network application configuration and tuning is provided to match the network application to the computing environment at any given entangled system site. In another aspect of the exemplary method embodiment, maintenance of the distributed network application is performed. For example, if a particular entangled site would require a database compaction then that site can be instructed to compact the database for the particular application.

Next in the exemplary method embodiment at step 1106, the network application workload is distributed around the entangled sites of the multi-site entangled system. In another aspect of the exemplary method embodiment a distribution policy, associated with a network application and implemented by the dedicated non-blocking communication network, specifies which site will process which packets. It should be noted in the exemplary embodiment that the network applications of a multi-site entangled system can be managed from a single location and appears as a single application distributed throughout the multi-site entangled system.

Figure 12:
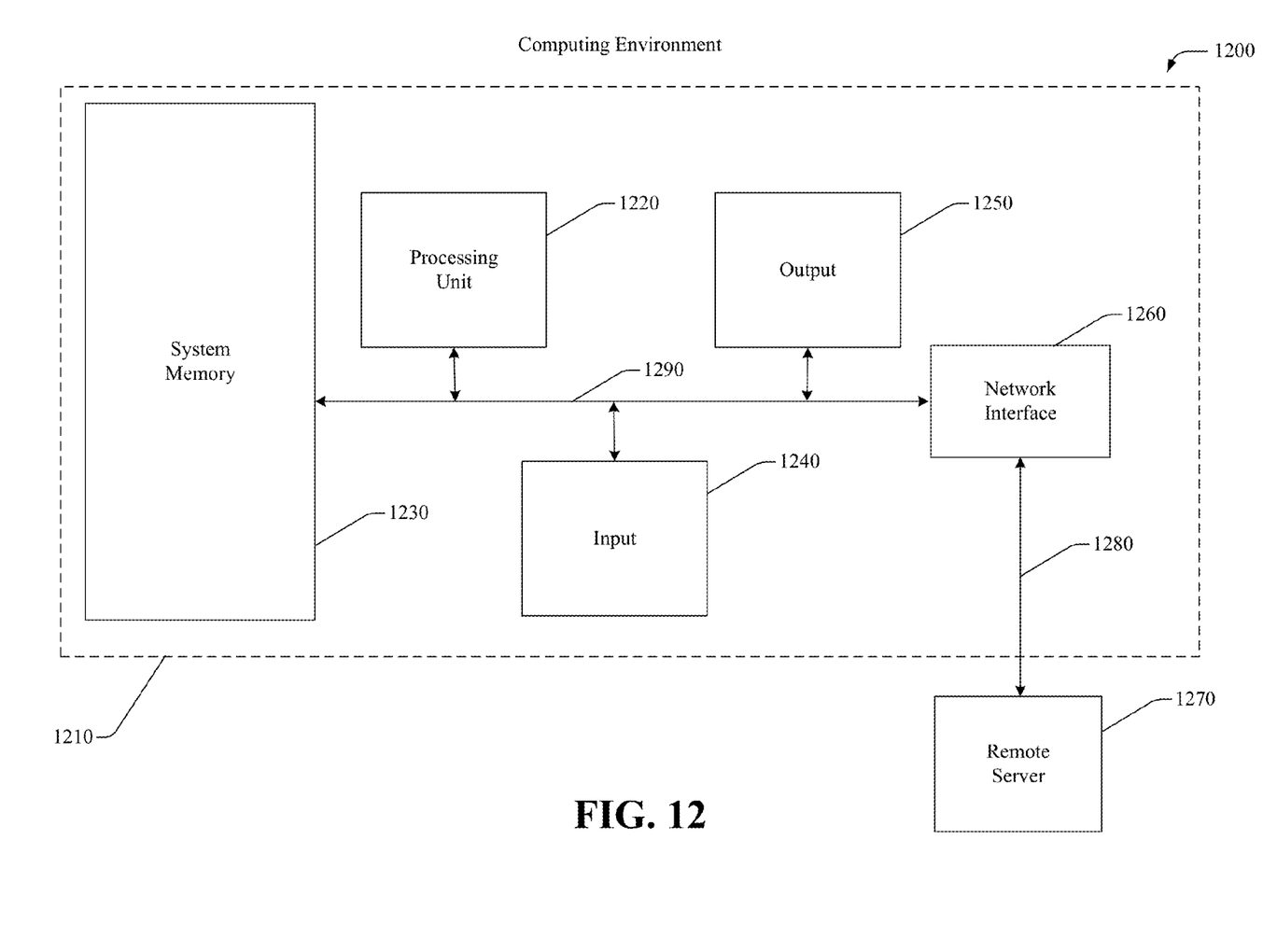
FIG. 12 depicts an exemplary computing device for implementing a multi-site entangled system, with a single administrative location, for distributing network applications.

FIG. 12 illustrates an example of a suitable computing system environment 1200 in which the claimed subject matter can be implemented, although as made clear above, the computing system environment 1200 is only one example of a suitable computing environment for an exemplary embodiment and is not intended to suggest any limitation as to the scope of use or functionality of the claimed subject matter. Further, the computing environment 1200 is not intended to suggest any dependency or requirement relating to the claimed subject matter and any one or combination of components illustrated in the example computing environment 1200.

Looking now to FIG. 12, an example of a device for implementing the previously described innovation includes a general purpose computing device in the form of a computer 1210. Components of computer 1210 can include, but are not limited to, a processing unit 1220, a system memory 1230, and a system bus 1290 that couples various system components including the system memory to the processing unit 1220. The system bus 1290 can be any of several types of bus structures including a memory bus or memory controller, a peripheral bus, and a local bus using any of a variety of bus architectures.

Computer 1210 can include a variety of computer readable media. Computer readable media can be any available media that can be accessed by computer 1210. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media can embody computer readable instructions, data structures, program modules or other data in a modulated data signal such as a carrier wave or other transport mechanism and can include any suitable information delivery media.

The system memory 1230 can include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, can be stored in memory 1230. Memory 1230 can also contain data and/or program modules that are immediately accessible to and/or presently being operated on by processing unit 1220. By way of non-limiting example, memory 1230 can also include an operating system, application programs, other program modules, and program data.

The computer 1210 can also include other removable/non-removable and volatile/nonvolatile computer storage media. For example, computer 1210 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1290 through a non-removable memory interface such as an interface, and a magnetic disk drive or optical disk drive can be connected to the system bus 1290 by a removable memory interface, such as an interface.

A user can enter commands and information into the computer 1210 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 1220 through user input 1240 and associated interface(s) that are coupled to the system bus 1290, but can be connected by other interface and bus structures, such as a parallel port, game port or a universal serial bus (USB).

A graphics subsystem can also be connected to the system bus 1290. In addition, a monitor or other type of display device can be connected to the system bus 1290 through an interface, such as output interface 1250, which can in turn communicate with video memory. In addition to a monitor, computers can also include other peripheral output devices, such as speakers and/or printing devices, which can also be connected through output interface 1250.

The computer 1210 can operate in a networked or distributed environment using logical connections to one or more other remote computers, such as remote server 1270, which can in turn have media capabilities different from device 1210. The remote server 1270 can be a personal computer, a server, a router, a network PC, a peer device or other common network node, and/or any other remote media consumption or transmission device, and can include any or all of the elements described above relative to the computer 1210. The logical connections depicted in FIG. 12 include a network 1280, such as a local area network (LAN) or a wide area network (WAN), but can also include other networks/buses.

When used in a LAN networking environment, the computer 1210 is connected to the LAN 1280 through a network interface 1260 or adapter. When used in a WAN networking environment, the computer 1210 can include a communications component, such as a modem, or other means for establishing communications over a WAN, such as the Internet. A communications component, such as a modem, which can be internal or external, can be connected to the system bus 1290 through the user input interface at input 1240 and/or other appropriate mechanism.

In a networked environment, program modules depicted relative to the computer 1210, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device implementing a virtual keyboard. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

Further, the term to "infer" or "inference" refer generally to the process of reasoning about or inferring states of the system, environment, user, and/or intent from a set of observations captured from events and/or data. Captured events and data can include user data, device data, environment data, behavior data, application data, implicit and explicit data, etc. Inference can be employed to identify a specific context or action, or can generate a probability distribution over states, for example. The inference can be probabilistic in that the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A system comprising:
   a first network site having local processing components configured to perform processing for a network application;
   a second network site geographically separated from the first network site and having local processing components configured to perform processing for the network application; and
   a three-stage folded Clos switching fabric configured to switch packet traffic associated with the network application between the first and second network sites, said three-stage folded Clos switching fabric providing non-blocking connections between respective ones of the local processing components at the first network site, non-blocking connections between respective ones of the local processing components at the second network site, and non-blocking connections between respective ones of the local processing components at the first network site with respective ones of the local processing components at the second network site, and wherein said three-stage folded Clos switching fabric comprises, for each of one or more switching fabric planes:
      a local switching stage at the first network site that communicatively interconnects each local processing component at the first network site with every other local processing component at the first network site;
      a local switching stage at the second network site that communicatively interconnects each local processing component at the second network site with every other local processing component at the second network site; and
      a middle switching stage that interconnects the local switching stage at the first network site with the local switching stage at the second network site, said middle switching stage being split between the first and second network sites and comprising replicated middle stages at the first and second network sites that are interconnected via one or more dedicated optical links running between the first and second network sites.

2. The system of claim 1, wherein each local processing component is a computer server.

3. The system of claim 1, wherein the three-stage folded Clos fabric comprises two or more switching fabric planes, each switching fabric plane providing non-blocking connections as between respective pairings of the local processing components at the first network site, as between respective pairings of the local processing components at the second network site, and as between respective pairings of local processing components between the first and second network sites.

4. The system of claim 3, further comprising one or more fabric adaptor bridges at each of the first and second network sites, said fabric adaptor bridges configured to perform adaptation of the packet traffic to or from given ones of the local processing components at the first or second network sites and respective ones of the two or more switching fabric planes.

5. The system of claim 3, wherein there is at least one dedicated optical link between the first network site and the second network site, for each switching fabric plane.

6. The system of claim 1, wherein the network application is a distributed application, and wherein the system is configured to reallocate a workload of the network application as between the first and second network sites based on a respective loading of the first and second network sites or a failure of either the first or second network site.

7. The system of claim 1, wherein, including the first and second network sites, the system comprises three or more network sites, each site being geographically separated from the other sites and including respective local processing components configured to perform processing for the network application, and wherein the three-stage folded Clos switching fabric comprises a Valiant network topology providing non-blocking connections between the respective network sites via the one or more dedicated optical links.

8. The system of claim 7, wherein the middle switching stage is replicated at each network site and provides interconnectivity to the replicated middle stage at every other network site, and wherein the number of dedicated optical links exiting each network site are evenly distributed with respect to the other network sites.

9. The system of claim 1, wherein the local switching stage at the first network site comprises a first stage of the three-stage folded Clos switching fabric, the local switching stage at the second network site comprises a third stage of the three-stage folded Clos switching fabric, and wherein the replicated middle stages at the first and second network sites together comprise a second stage of the three-stage folded Clos network, said second stage bridging between the first and second network sites via the dedicated optical link.

* * * * *